Nov. 14, 1933.  A. J. SCALISE  1,934,996
FOLDING PIE CUTTER
Original Filed Feb. 8, 1932   3 Sheets-Sheet 1

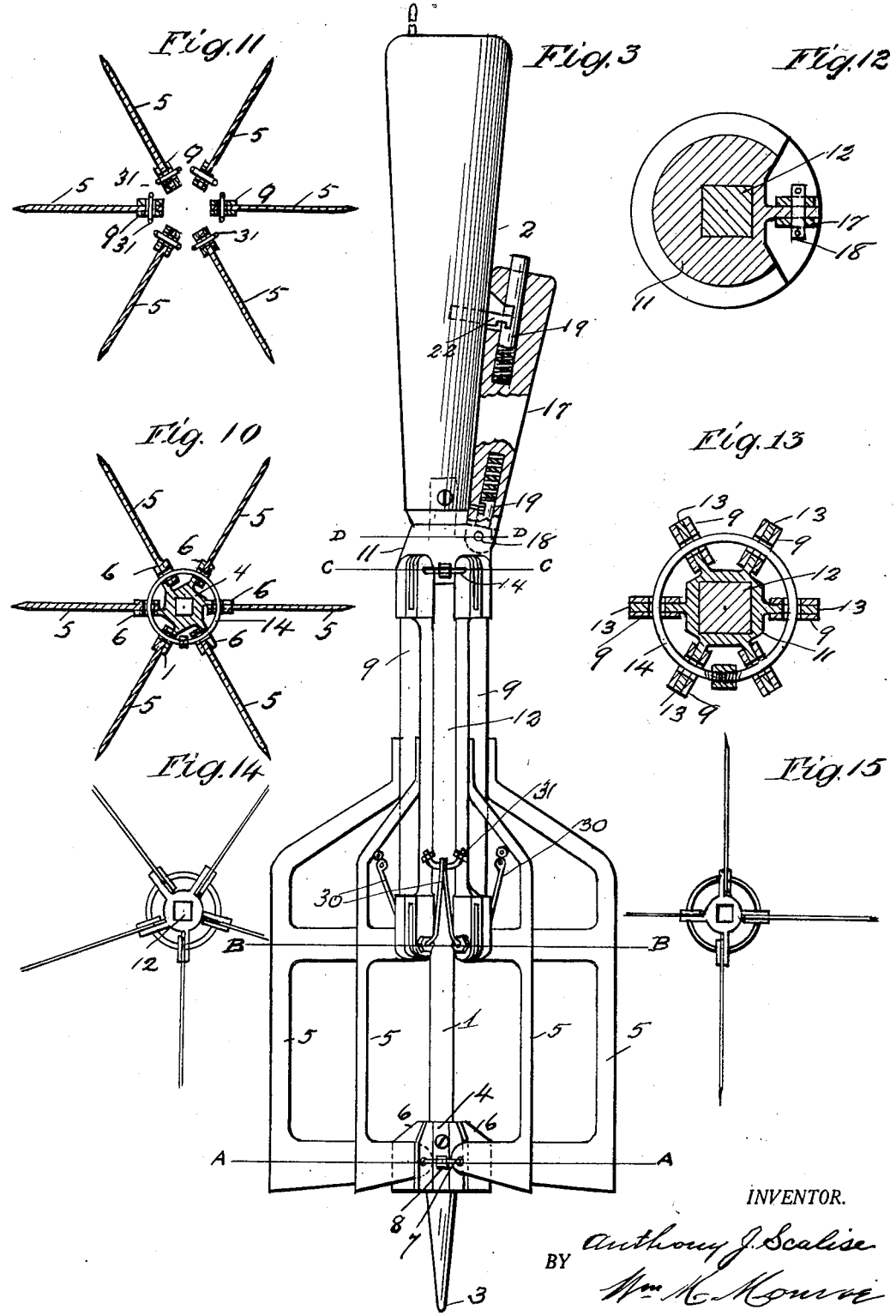

Patented Nov. 14, 1933

1,934,996

UNITED STATES PATENT OFFICE 1,934,996

FOLDING PIE CUTTER

Anthony J. Scalise, Cleveland, Ohio

Application February 8, 1932, Serial No. 591,545
Renewed September 18, 1933

5 Claims. (Cl. 146—209)

The invention relates to implements for cutting pies and cakes or any soft material for general kitchen service in hotels, restaurants or private homes, and the particular object is to provide a folding construction for the device that will enable it to be compressed into a compact form and locked, so that it can be kept in a drawer with other kitchen implements.

The invention also includes a cutting device having detachable cutting blades, which may be interchangeable and can be made of any desired length.

The device is primarily constructed with a predetermined number of blades by means of which a pie or cake can be cut into a similar number of equal portions, and any desired number of blades can be removed at will from the device, thus proportionally increasing the size of the portions. Also the blades can be readily sharpened, either in their places in the device or separately after they have been removed.

The invention includes a central or axial standard, having a pointed lower end, upon which the blades and outer supports are slidably movable.

It also includes a fixed hub or support adjacent to the lower end of the standard in which the inner ends of all the blades are pivoted.

It further includes a sleeve member, slidable upon the standard, and radial arms having their extremities pivoted respectively in said sleeve and the outer ends of the blades.

It includes a handle for holding the standard in the upright position and a handle for operating the sliding sleeve in which the spreading links are pivoted. This latter handle is also pivoted for folding and means are provided for locking it in folded and horizontal positions.

Locking means are also provided which permit the removal of any one blade from the device for substitution or sharpening. Also connecting links between adjoining blades are provided which are constructed and arranged to fold against the standard when the blades are folded.

The invention is exemplified in the accompanying drawings hereinafter more fully described and particularly pointed out in the claims.

Figure 1:
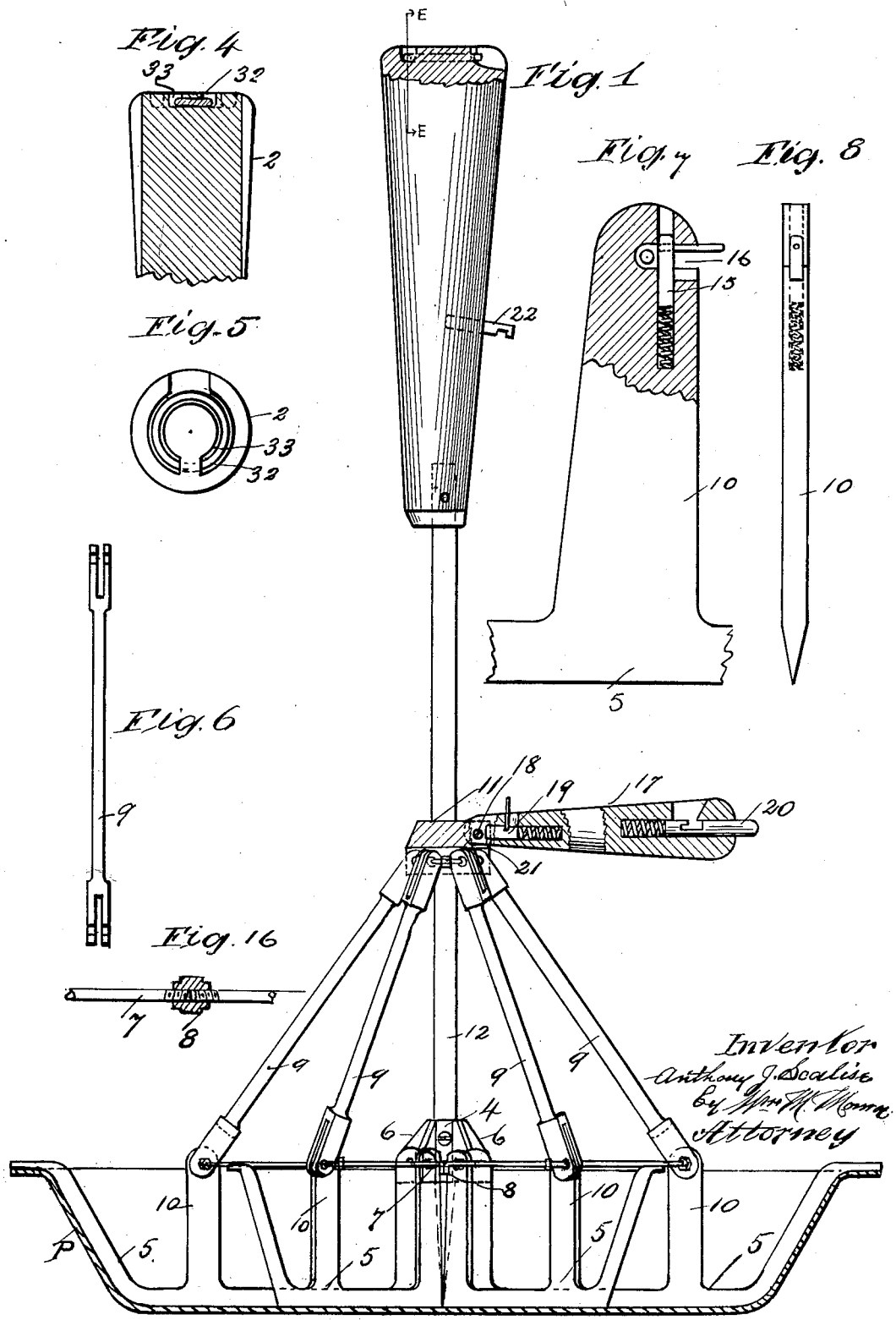
Figure 2:
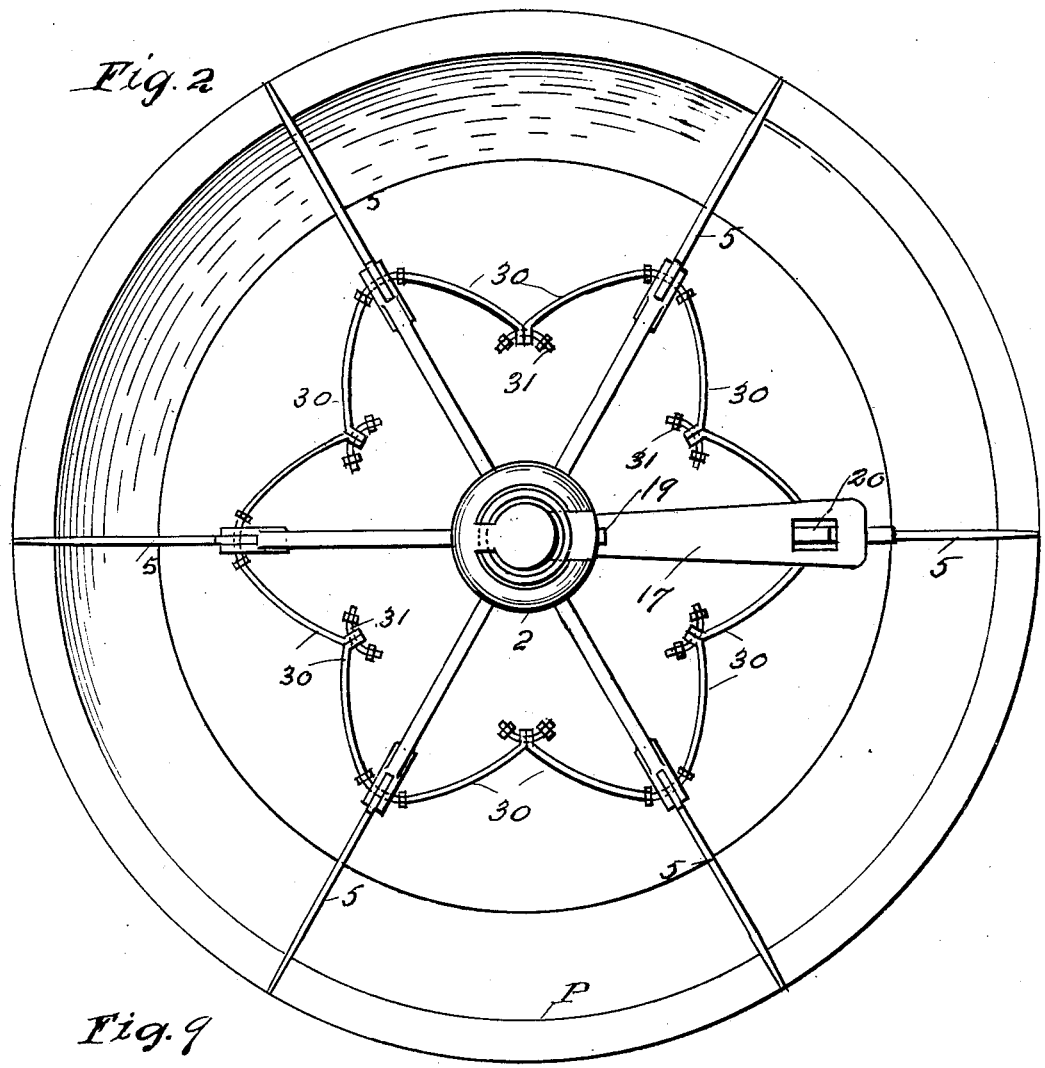
Figure 9:
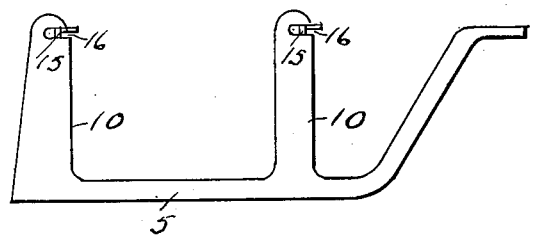

In the accompanying drawings Figure 1 is a side elevation of the device, showing it in use in a pie tin; Figure 2 is a plan thereof; Figure 3 is an elevation of the same showing the device in a folded condition; Figure 4 is a vertical section of the stationary handle showing the hanger therefor; Figure 5 is a plan thereof; Figure 6 is a plan of one of the links, connecting each blade with a movable sleeve; Figure 7 is a vertical section of the link support on each blade and the releasable closure therefor; Figure 8 is an edge elevation thereof; Figure 9 is a side elevation of one of the blades; Figure 10 is a transverse section on line A—A, Figure 3; Figure 11 is a transverse section thereof on line B—B, Figure 3; Figure 12 is a transverse section thereof on line C—C, Figure 3; Figure 13 is a transverse section thereof on line D, D, Figure 3; Figure 14 is a transverse section of the standard showing attaching means for links for five blades; Figure 15 is a similar section showing attaching means for four links. Fig. 16 is a section of the coupling nut for the rings.

In these views 1 represents a standard having a handle 2 fixed upon the upper end, and having a point 3 at its lower end, which is inserted in the center of the pie or cake to be cut, which is shown in a baking pan P.

At the lower end of the standard is shown a fixed hub or support 4, in which the inner ends of thin knife blades 5 are pivoted and from which they extend radially outward. These blades are pivoted upon flanges 6, 6, upon this hub.

As many blades may be employed as may be desired, six are shown, but the number may be reduced to five or four as shown in Figures 14 and 15 if desired.

The blades may be detachably supported upon a split ring 7 which passes through all the flanges, and the ends of the ring may be connected by means of the coupling nut 8 reversely threaded for adjustment, upon the ring extremities.

The outer ends of the blades are supported by means of radial links 9, 9, the extremities of which are respectively pivoted in the elevated stems 10, 10, and in the sleeve 11, which is preferably provided with a square opening 11, and moves up and down over the square portion 12 of the standard, thus serving to permit the blades to be folded upon the standard when not in use.

The links are pivoted upon flanges 13 of the sleeve and are detachably mounted upon a split ring 14 in the same manner that they are pivoted in the hub.

The links are detachably secured in the stems 10, by means of spring pressed locking pins 15, 15, that close the entrances to the slots 16, through which their pivot pins are inserted.

The sliding sleeve is provided with an operating handle 17 which is pivoted thereto at 18 and is provided with a locking pin 19 to lock it in the horizontal position and with a similar lock ring pin 20 to lock it in the folded position.

The pin 19 engages with a detent 21, in the sleeve and the pin 20 engages with a detent 22 upon the stationary handle. The blades are spaced apart and supported by means of the hinged coupling rods 30 pivoted together at 31.

With any predetermined number of blades, the number of portions cut can be doubled by revolving the implement upon the central point, so that the blades will make cuts half way between the former cuts. Also by removing some of the blades larger portions can be cut at pleasure.

In Figs. 4 and 5 holding ring 32 is shown embedded in a groove 33 in the top of the handle, by means of which the device can be hung upon a hook if desired.

Having described the invention, what I claim as new and desire to secure by Letters Patent is—

1. In a device for the purposes described, the combination with a central standard having a pointed lower end, of a hub secured adjacent to said pointed end, radially extended and circumferentially spaced vertical blades, said blades each having its inner extremity pivoted in said hub, a sleeve slidable upon said standard, upright members adjacent to the outer ends of said blades and links, connecting said sleeve and upright members.

2. In a device for the purposes described, the combination with a central standard having a pointed lower end, of a hub secured adjacent to said pointed end, radially extended and circumferentially spaced vertical blades, said blades each having its inner extremity pivoted in said hub, a sleeve slidable upon said standard, upright members adjacent to the outer ends of said blades and links connecting said sleeve and upright members, and laterally extending foldable spring loops connecting said links intermediate of said sleeves and knives, and intermediate connecting links therefor.

3. In a device for the purposes described, the combination with a central standard having a pointed lower end, of a hub secured adjacent to said pointed end, radially extended and circumferentially spaced vertical blades, said blades each having its inner extremity pivoted in said hub, a sleeve slidable upon said standard, upright members adjacent to the outer ends of said blades and links connecting said sleeve and upright members, and laterally extending foldable spring loops connecting said links intermediate of said sleeves and knives, and intermediate connecting links therefor, a rigid handle upon the outer end of said standard, and a handle pivoted in said sleeve, spring pressed interlocking means upon said pivoted and rigid handles positioned to retain the pivoted handle in the vertical position and spring pressed interlocking means upon said pivoted handle, and sleeve positioned to, alternately therewith, retain the handle, in a horizontal position.

4. In a device for the purposes described, the combination with a central standard having a pointed lower end, of a hub secured adjacent to said pointed end, radially extended and circumferentially spaced vertical blades, said blades each having its inner extremity pivoted in said hub, a sleeve slidable upon said standard, upright members adjacent to the outer ends of said blades and links connecting said sleeve and upright members, said sleeve and hub being provided with radial flanges and split rings passing through said flanges and through the extremities of said links and lock nuts for the extremities of said rings.

5. In a device for the purposes described, the combination with a central standard having a pointed lower end, of a hub secured adjacent to said pointed end, radially extended and circumferentially spaced vertical blades, said blades each having its inner extremity pivoted in said hub, a sleeve slidable upon said standard, upright members adjacent to the outer ends of said blades and links connecting said sleeve and upright members, said sleeve and hub being provided with radial flanges and split rings passing through said flanges and through the extremities of said links and lock nuts for the extremities of said rings, and foldable connecting members for said upright members.

ANTHONY J. SCALISE.